May 1, 1962 H. HAMER 3,032,745

DATA TRANSMISSION SYSTEM

Filed April 7, 1959 2 Sheets-Sheet 1

May 1, 1962 H. HAMER 3,032,745

DATA TRANSMISSION SYSTEM

Filed April 7, 1959 2 Sheets-Sheet 2

RECEIVER WAVEFORMS

1

3,032,745

DATA TRANSMISSION SYSTEM

Howard Hamer, West Long Branch, N.J., assignor to Electronic Associates, Inc., Long Branch, N.J., a corporation Filed Apr. 7, 1959, Ser. No. 804,815
6 Claims. (Cl. 340—170)

Figure 1:
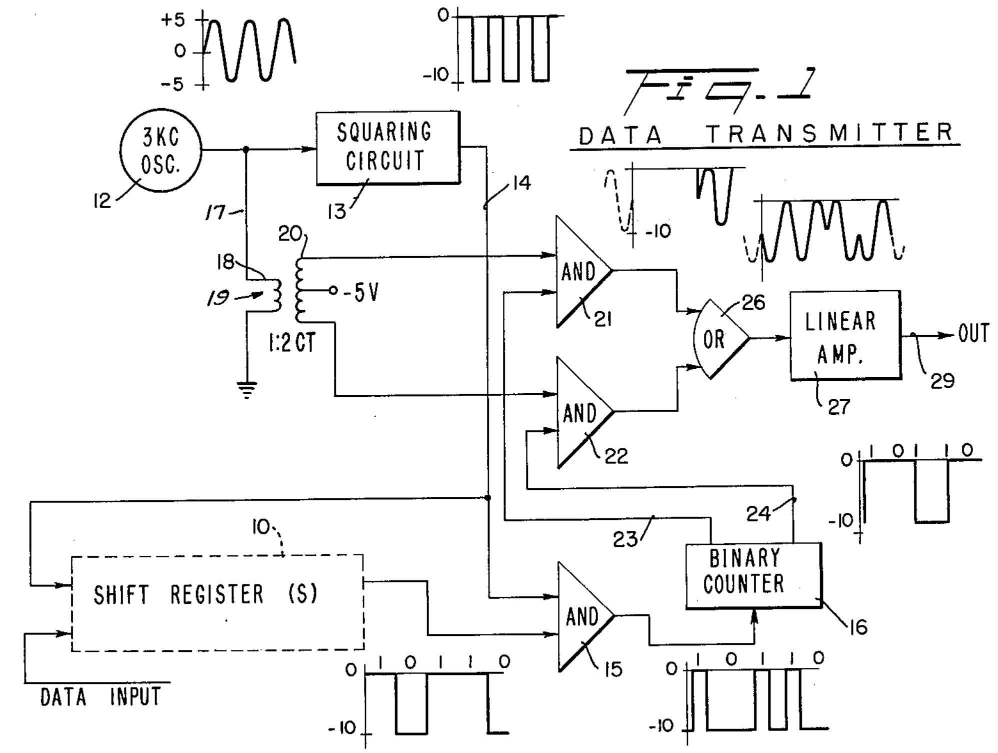

This invention relates to data transmission and more particularly to a new and novel serial data transmission system.

Data, which is generated at a given point, often has to be transmitted to some other remote point. Telephone facilities are sometimes employed for data transmission. Current telephone systems are limited as to band width and the number of bits that can be transmitted on conductors. Serial systems are more limited than parallel systems since a single conductor is employed. Parallel systems are quite complex and require several conductors.

Facilities other than conductor facilities are employed to transmit data, for example, radio facilities. While radio facilities are perhaps more flexible than conductor facilities, their flexibility is limited by frequency allocation problems and by the propagation characteristics of the frequency band width used. Moreover, the systems are relatively complex and expensive.

In many cases, where data is transmitted, a datum must be indicated at the time it is occurring and is sent in "real time" as distinguished from sending it much later. Data can become "stale," i.e. lose its value, if delayed too long in transmission. Accordingly, the speed of transmission is important in many applications. Accordingly, the number of bits a system can handle per given unit of time is often quite important.

Where data has been reduced to binary indications or binary digits, it is termed digital. Digital information may be transmitted by telephone facilities over a group of wires by assigning one digit to each wire, and this is known as parallel transmission. Or the various digits may be assigned to successive ordered pulses (or spacing intervals) on a single wire and this is called serial transmission.

These last mentioned systems usually require synchronizing means, timing data and the information must be indicated, as for example, by the wave front of an appropriate transition say in voltage. Where successive digits are transmitted serially, the start of a sequence is usually identified by some auxiliary information. Sometimes, the auxiliary information is in the nature of a pilot, reference or calibration datum against which the magnitude of the utilized data are compared before actual use. Other auxiliary information is sometimes needed for error checking to preclude impairment of the data transmitted.

It is a principal object of the present invention to provide a very inexpensive serial data transmission system using simple digital logical circuitry for taking advantage of the reduced complexity and costs of single conductor transmission systems, yet being capable of transmitting digital data more rapidly than serial conductors have heretofore been able to transmit them.

Another object is to provide a highly reliable and accurate data transmission system free of errors in the transmission eliminating the need of auxiliary data and associated devices for error checking and comparison between the signals actually sent and those actually received.

Still another object is to provide a data transmission system transmitting on a standard telephone voice channel with a high degree of noise immunity.

A feature of the data transmission system, according to the invention, is the provision of a transmitter for generating a sinusoidal carrier signal that shifts binary digital

2 data out of a register as serial pulses and this signal is employed to generate two like sinusoidal signals of opposite polarity on which the data to be transmitted, represented by the pulses, is superimposed as phase variations of the two signals successively under control of the signal pulses. These two sinusoidal signals are then combined into a single output signal having the information content of the two signals and thereby able to handle a greater quantity of information or intelligence content in the carrier signal output of the transmitter.

There are no restrictions on the allowable messages, so that they may consist of any arbitrary sequence of bits. Synchronism is achieved by shifting the data out of the register using a square wave for shifting which is derived from the carrier signal. The carrier frequency is not critical, but preferably should be close to the upper frequency limits of the transmission medium.

A remote receiver in the system receives the transmitter output and converts it into usable serial pulses corresponding to the first mentioned pulses representative of the digital data shifted out of the register.

Figure 2:
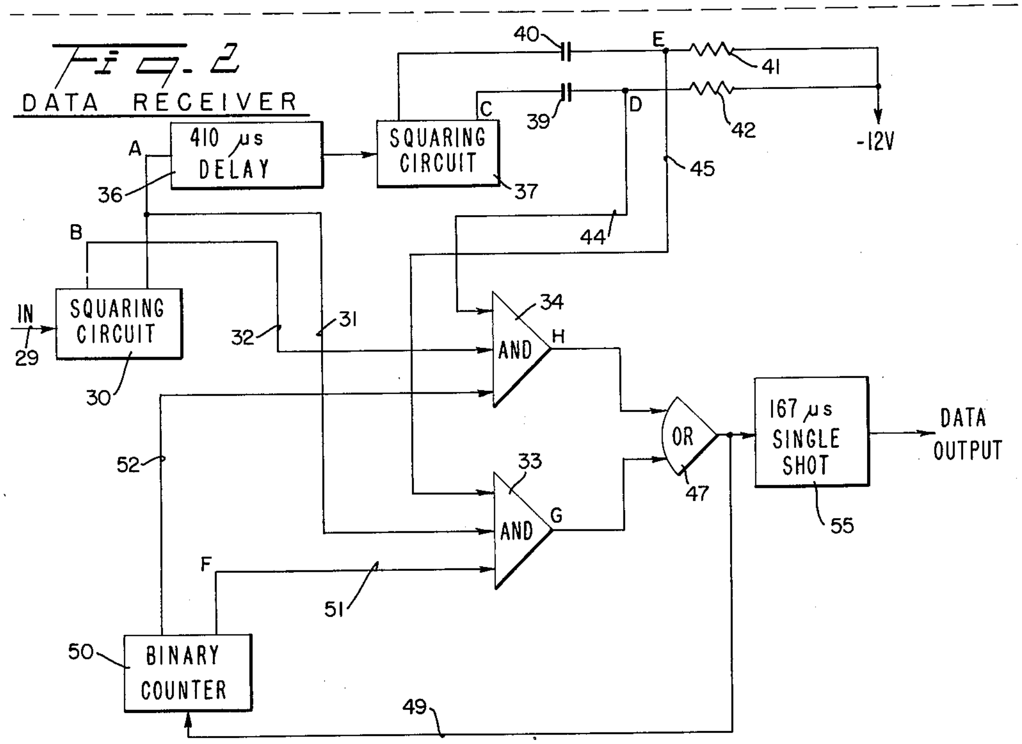
Figure 3:
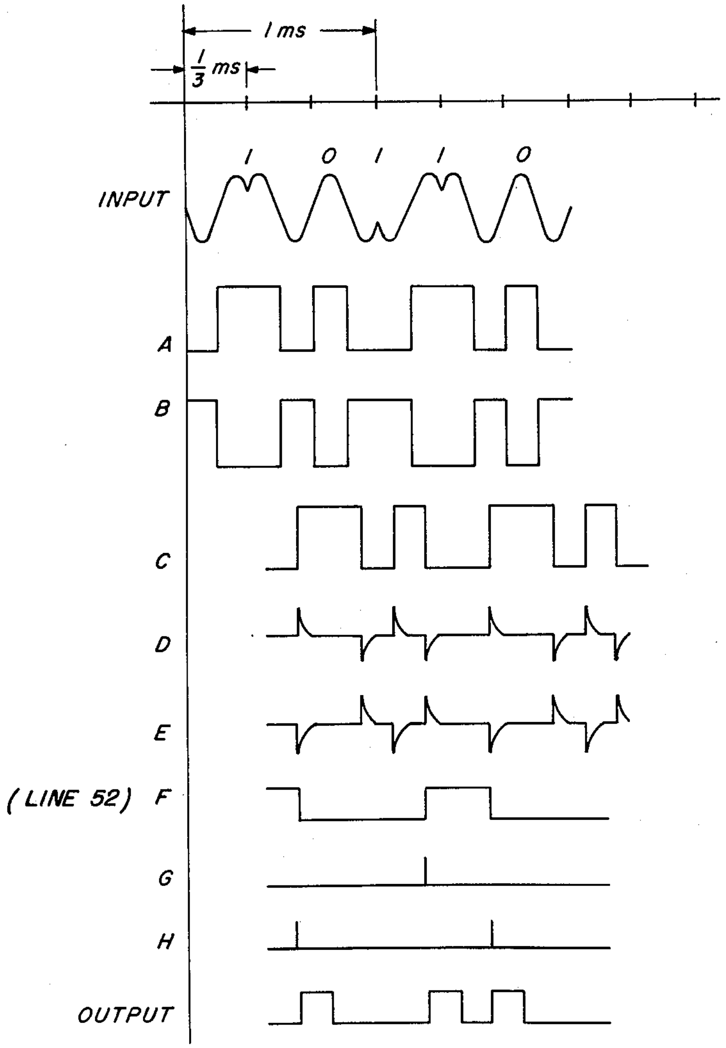

Other objects, features and advantages of the data transmission system, according to the present invention, will be better understood by the following specification in conjunction with the drawings and appended claims in which:

FIG. 1 is a block diagram of a data transmitter in a system, according to the invention, FIG. 2 is a block diagram of a data receiver usable with the transmitter of FIG. 1, FIG. 3 is a diagram illustrative of the wave forms in the receiver shown in FIG. 2.

Referring to FIG. 1, which shows a schematic block diagram of the transmitter according to the invention, together with wave forms at various points in the circuit in combination with a shift register or registers shown schematically as a block 10. The registers 10 provide static storage for binary digital data and are, for example, arranged to be shifted in digit-serial form holding the data static until it is shifted out as digits. The register receives the data it holds statically from a data generating device, as for example, a computer or a digital voltmeter, not shown.

A 3 kc. oscillator 12 generates a first sinusoidal carrier signal and applies it to a squaring circuit 13 similar to a Schmidt trigger having a squared wave output applied along line 14 to the shift line of registers 10 to shift out a binary digit in serial form, as for example, a binary-coded decimal digit represented by a combination of five binary conditions 10110, as shown, in which the "0" conditions are represented by negative voltages and the conditions "1" are represented by positive-going pulses.

The squared wave output of the squaring circuit 13 is also applied to a gating amplifier 15 which gates the register output so that for each "1" shifted out a 167 microsecond pulse is produced. These pulses are added in a binary counter 16 so that each "1" is represented by a change of state of the counter output. The 3 kc. sinusoidal carrier signal is further applied along line 17 to a primary winding 18 of a high quality isolation transformer 19. The transformer 19 accurately produces at its secondary winding 20 two equal, but opposite phase, sinusoidal signals applied to gating or "AND" circuits 21 and 22 respectively.

The outputs from binary counter 16 are applied to gating circuits 21 and 22 along lines 23 and 24 respectively and are used to alternately gate the two 3 kc. signals developed by the transformer 19. The output signals from the gating circuits 21 and 22 are summed in a logical "OR" circuit 26, amplified in a linear amplifier 27 and transmitted along a voice channel 29 as a carrier output of the transmitter. It will be thus readily understood that each binary "1" results in a change in phase in the output 3 kc. signal. It is these changes in phase in the output signal which contain or correspond to the original binary digital data shifted out of registers 10.

The transmitter output of the data transmission system is received by a data receiver. FIG. 2 shows the data receiver in block diagram form and FIG. 3 illustrates the wave forms at specific points in the diagram of FIG. 2. The incoming signal from the transmitter is received by an amplifying and squaring circuit 30 having two amplified square wave outputs A and B which cross zero when the sinusoidal input carrier signal crosses zero. The square waves are applied along lines 31 and 32 respectively to "AND" circuits 33 and 34 respectively.

The square wave A is also applied to a delay circuit 36 where it is delayed, for example, approximately 1.25 carrier periods (410 microseconds) to provide a demodulation reference. After being reshaped by a squaring circuit 37, the demodulation reference is provided as a periodic square wave output C. The square wave output C of squaring circuit 37 is passed through RC trigger circuits or differentiating networks comprising condensers 39, 40 and impedance elements 41, 42 connected as shown. The trigger circuits are connected to "AND" circuits 34 and 35 by lines 44 and 45 respectively along which the network output wave forms are applied to the "AND" circuits which function as coincidence gates. It being understood that both phases E and D of the delayed wave are applied along lines 44 and 45 respectively.

The "AND" circuits 33, 34 determine which polarity of the phases D or E of the square wave form C are permitted to go through into an "OR" circuit 47 which can pass either polarity of signals D, E. The output of the "OR" circuit 47 is applied along line 49 to a binary counter 50 whose outputs are connected by lines 51 and 52 to the "AND" circuits 33, 34, respectively, which can pass one signal at coincidence of energization of the three input lines thereto.

In this manner, both phases of the delayed wave C are differentiated and gated by both the undelayed signal and the state of the output binary counter 50. The resulting output wave form F from the counter 50 is thus a duplicate of the output of the binary counter 16 of the data transmitter and the pulses G, H driving the receiver binary counter 50 as an output from "OR" circuit 47 are a duplicate of the original data.

The output pulses from the "OR" circuit 47 are applied to a final single shot 55 which generates a pulse of 167 microseconds every time an input pulse is presented so that its output corresponds to the binary digital data shifted out of registers 10.

While a preferred embodiment of the data transmission system, according to the invention, has been shown and described, it will be understood that many changes and modifications can be made in the system within the spirit and scope of the invention.

What I claim and desire to secure by letters patent is:

1. In a phase shift modulated system for transmitting data in a binary system of notation comprising, in combination with a source of digital data, first means for generating a carrier frequency signal, means responsive to said carrier signal for shifting the digital data out of said source as a train of serial pulses representing the binary quantities "0" and "1," second means responsive to said carrier signal for generating two signals of opposite phase at the carrier frequency, first logical "and" circuit means producing output signals responsive to the train of serial pulses and the carrier frequency signal, a binary counter actuated between a one and another state by the output signals from said logical "and" circuit means, an output circuit, and means including second logical "and" circuit means operatively connected to said second generating means and to said binary counter for applying either one or the other of the two signals from said second generating means to said output circuit.

2. In a phase shift modulated system for transmitting data in a binary system of notation comprising, in combination with a source of digital data, first means for generating a carrier frequency signal and for shifting the digital data out of said source as a train of serial pulses representing the binary quantities "0" and "1," second means for generating two signals of opposite phase at the carrier frequency in response to the signal output from said first generating means, logical "and" circuit means producing output signals in response to the train of serial pulses and in response to the carrier frequency signal, a binary counter actuated between a one and opposite state by the output signals from said logical "and" circuit means, an output circuit, and means operatively connected to said second generating means for applying either one or the other of the two signals therefrom to said output circuit in response to the state of said binary counter.

3. In a system for demodulating a received carrier signal which is phase shift modulated by data in a binary system of notation, the combination comprising first means for generating two signals of equal amplitude and opposite phase in response to the received carrier signal, second means for generating two differentiated signals of equal amplitude and opposite phase in response to one of the signals from said first generating means, a binary counter actuated between a one and opposite state, and means operatively connected to said first and second generating means and to said binary counter for producing a train of serial pulses representing the binary data modulating the received carrier signal.

4. In a system for receiving and demodulating a carrier signal which is phase shift modulated by data in a binary system of notation, the combination comprising first means for generating two signals of equal amplitude and opposite phase in response to the received carrier signal, second means for generating two additional signals of equal amplitude and opposite phase in response to one of the signals from said first generating means, means for differentiating each of the two additional signals from said second generating means, a binary counter actuated between a one and opposite state, and means operatively connected to said differentiating means, to said binary counter, and said first generating means for demodulating the received carrier signal.

5. In a system for receiving and demodulating a carrier signal which is phase shift modulated by data in a binary system of notation, the combination comprising first means for generating two signals of equal amplitude and opposite phase in response to the received carrier signal, second means for generating two additional signals of equal amplitude and opposite phase in response to one of the signals from said first generating means, means for differentiating each of the two additional signals from said second generating means, a binary counter actuated between a one and opposite state, and means including logical "and" circuit means operatively connected to said first generating means, differentiating means and binary counter, and responsive to the signals obtained therefrom producing a train of serial pulses representing the binary data modulating the received carrier signal, said binary counter being actuated between said one and opposite states in response to the train of serial pulses.

6. In a system for demodulating a received carrier signal which is phase shift modulated by data in a binary system of notation, the combination comprising first means for generating two signals of equal amplitude and opposite phase in response to the received carrier signal, second means for generating a pair of differentiated signals of equal amplitude and opposite phase in response to one of the signals from said first generating means, logical "and" circuit means operatively connected to receive one of the signals from said first and second generating means, another logical "and" circuit means operatively connected to receive another of the signals from said first and second generating means, and means operatively connected to the output of said one and other logical "and" circuit means for generating a train of serial pulses in response to the output signals therefrom and in response to the train of serial pulses alternately enabling the one and then the other of said logical "and" circuit means.

References Cited in the file of this patent

UNITED STATES PATENTS 2,676,245 Doelz ------------------- Apr. 20, 1954

FOREIGN PATENTS 676,100 Great Britain ------------- July 23, 1952